P. O. TROUTMAN.
ENGINE VALVE.
APPLICATION FILED AUG. 17, 1916.

1,220,291. Patented Mar. 27, 1917.

WITNESSES

INVENTOR
P. O. Troutman,
by Bakewell, Byrnes & Parmelee,
attys.

UNITED STATES PATENT OFFICE.

PHILLIP O. TROUTMAN, OF SHARON, PENNSYLVANIA.

ENGINE-VALVE.

1,220,291.　　　　　Specification of Letters Patent.　　Patented Mar. 27, 1917.

Application filed August 17, 1916.　Serial No. 115,361.

*To all whom it may concern:*

Be it known that I, PHILLIP O. TROUTMAN, a citizen of the United States, residing at Sharon, in the county of Mercer and State of Pennsylvania, have invented a new and useful Improvement in Engine-Valves, of which the following is a full, clear, and exact description, reference being had to the accompanying drawings, forming part of this specification, in which:—

Figure 1:
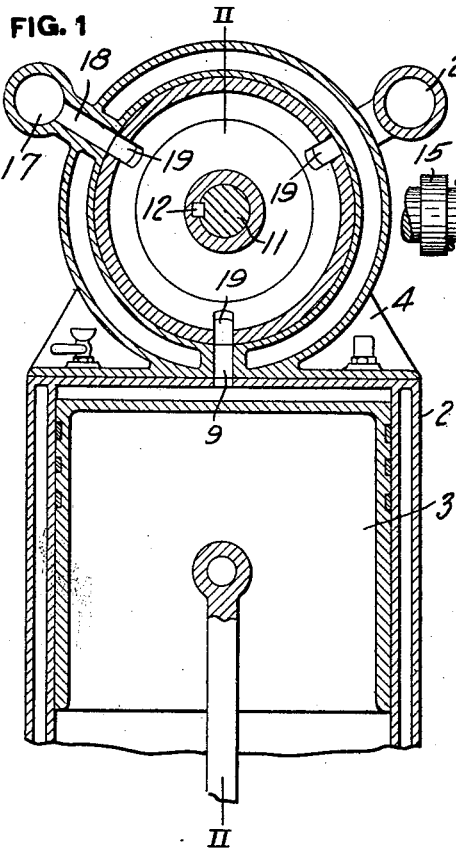
Figure 1 is a sectional view on the line I—I of Fig. 2 showing one form of engine with my improved valve.
Figure 2:
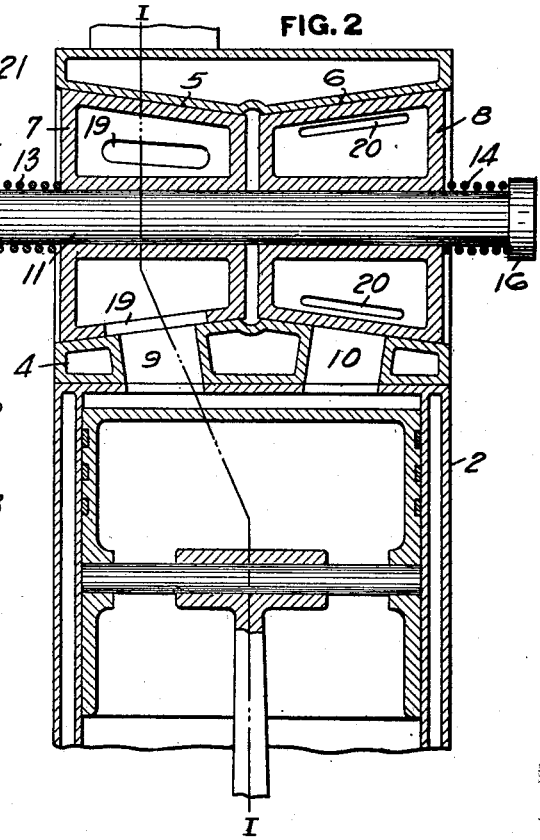
Fig. 2 is a similar view on the line II—II of Fig. 1.

This invention relates to an improvement in rotary valves for engines, and is designed to provide a cheap and efficient valve which can readily be assembled and removed, and which is so arranged that the members thereof will be shifted automatically to take up the wear of the valves or the seats.

One of the objects of my invention is to provide a valve of this character which is provided with a plurality of ports which are so arranged that the valve will only make a portion of a cycle for each cycle of the engine, so that the valve can be operated comparatively slow, and thereby reduce excessive wear of the parts, as well as heat generated by the frictional contact of the valve or valve members with the seats. Another object of my invention is to form the valve of two conical shaped members each of which is held in its seat by yielding means, the arrangement being such that the ports for admitting the actuating fluid to the cylinder are controlled by one member, while the exhaust ports are controlled by the other member; the arrangement being such that the expansion and contraction of the one member will shift said member with relation to its seat without affecting the other member. Furthermore, by means of an arrangement of this character there will be no waste of the actuating fluid, as the actuating fluid is arranged to pass through one member of the valve, while the exhaust passes through the other member thereof.

The precise nature of my invention will be best understood by reference to the accompanying drawings, which will now be described, it being premised, however, that changes may be made in the details of construction of the parts and the general arrangement thereof, without departing from the spirit and scope of my invention, as defined in the appended claims.

In the drawings in which I have shown the valve applied to an internal combustion engine, the reference character 2 designates the cylinder, and 3 the piston therein. 4 designates a valve casing, which is secured to the cylinder head in any desired manner, and which is provided with conical valve seats 5 and 6. These valve seats are shown as inversely tapered from the center of the valve casing to the ends thereof, and seated within these seats 5 and 6, are rotary valve members 7 and 8, respectively. 9 is the admission port for the actuating fluid which extends from the seat 5 through the wall of the casing 4 and the head of the cylinder, and 10 is a similar port which extends from the seat 6 to the interior of the cylinder 2. 11 is a valve shaft, and 12 is a spline for securing the valve members to said shaft, and which spline is so arranged that the valve members 7 and 8 will be rotated thereby, but are permitted to move longitudinally thereon. These valve members 7 and 8 are held to their seats by means of springs 13 and 14 which surround the shaft 11 and engage collars 15 and 16, respectively, secured to the shaft 11.

17 designates a chamber which is in communication with the actuating fluid supply, and 18 is a port communicating with the chamber 17 and which extends to the seat 5 for the valve member 7. The valve member 7 is provided with a central chamber, and has a plurality of ports 19 extending through the wall thereof which are arranged to permit the actuating fluid to enter the chamber when one of said ports is in communication with the port 18, and to permit the actuating fluid to pass to the cylinder through another of said ports 19 and the port 9 when said member is in the position shown in Fig. 1. By this means an unobstructed passage for the actuating fluid is formed through the interior of the valve member 7. The width of these ports may be varied to control the time of admission, and cut-off for the actuating fluid, as well as the time for opening the exhaust.

The valve member 8 is provided with similar ports 20 which communicate with the port 10 and a port which is in communication with the exhaust chamber 21.

The shaft 11 may be driven in any desired manner from the crank shaft of the engine.

Figure 4:
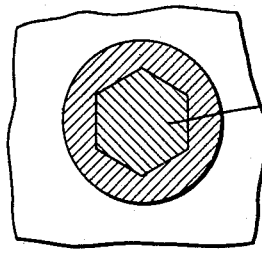
Fig. 4 is a detail sectional view of another form of valve shaft.

If desired, the valve shaft may be of polygonal form as shown at 11$^a$ in Fig. 4, and which should be provided with the proper number of sides so that the valves for one or more engines can be properly positioned thereon to bring them in timed relation to each other, it being understood that the various valve members are duplicates of each other, so that the same valve members may be used for an engine having a plurality of cylinders. By this means I am able to overcome the necessity of splines and key-ways in the valve members.

Figure 3:
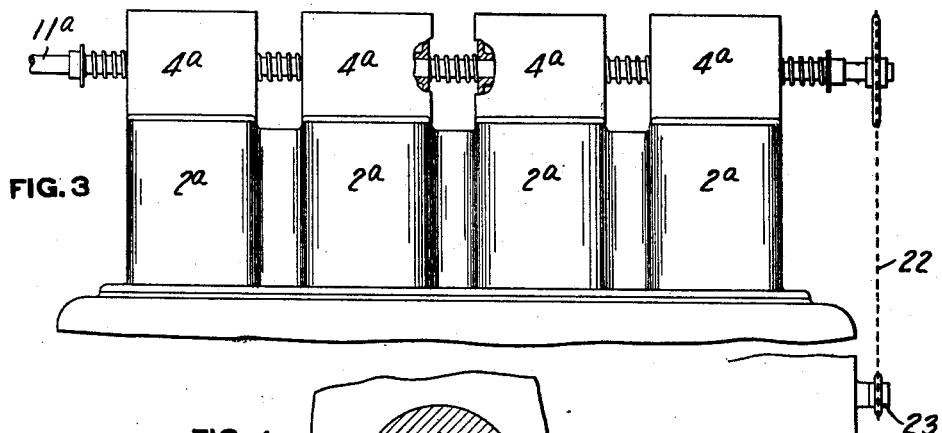
Fig. 3 is a side elevation partially in section of another form of engine with my improved valves attached.

In Fig. 3 I have shown an engine having four cylinders 2$^a$, and 4$^a$ are valve casings connected to said cylinders. In this construction it is only necessary to provide a single spring, such as 13$^a$ on the shaft 11$^a$, to retain adjacent valve members for controlling different cylinders as each spring between two valve casings is arranged to retain two valve members against their seats. In this figure I have shown gearing 22 connecting the shaft 11$^a$ with the crank shaft 23 of the engine, although it will readily be understood by those familiar with the art that various types of gearing can be used in place of that shown, and that other ratios than that shown can be used, the ratio being determined by the number of ports through the walls of the valve members.

It will be readily understood by those familiar with the art that a valve structure of this general type may be used for steam engines, pumps and similar devices, as readily as for internal combustion engines.

The advantages of my invention result from the provision of a valve having a plurality of tapered members for controlling the admission and exhaust from the cylinder, the arrangement being such that one member is arranged to move relative to the other, so that the expansion of the one member will not affect the other member. A further advantage results from the provision of means for yieldingly holding the valve members against their seats irrespective of expansion and contraction, or wear of the parts, the arrangement being such that the valve members will always be retained against their seats under a predetermined pressure.

I claim:

1. An engine, comprising a plurality of cylinders, there being a plurality of tapered valve seats above each of said cylinders, a tapered valve in each seat, ports through said valves arranged to communicate with inlet and exhaust ports communicating with their respective cylinders, for admitting fluid pressure to each cylinder and for opening the exhaust therefrom, a through shaft extending through all of said valves on which the valves are adapted to move longitudinally but are arranged to be rotated thereby, springs surrounding said shaft and engaging the valves for retaining the valves against their seat, and means for rotating the valve shaft, substantially as described.

2. An engine, comprising a cylinder, a valve casing having a plurality of tapered seats therein, a tapered valve member in each of said seats, a longitudinal shaft extending through said valves, means on said shaft for retaining the valves against their seats, there being a chamber within each of said valves, a plurality of ports in each valve extending through the walls thereof, ports extending through the valve casing, each of said ports communicating with the interior of the cylinder and one of the valve seats, there being other ports extending through the valve casing, one of said ports communicating with one of the valve seats and a fluid pressure inlet, the other port communicating with the other valve seat and an exhaust, said valves being arranged to intermittently admit fluid pressure through one of the ports communicating with the cylinder and another port communicating with the valve seat, while the other valve is arranged to intermittently permit the exhaust to pass from the engine through a port communicating with the cylinder and its valve seat and another port and the exhaust; substantially as described.

3. An engine, comprising a cylinder, a valve casing having a plurality of tapered seats therein, a tapered valve in each seat, a shaft extending through both valves, means on the shaft for retaining the valves against their seats, a chamber in each valve, there being ports extending through the valve casing, each of said valves communicating with one of the seats and the interior of the cylinder, there being a port through the valve casing communicating with a fluid pressure supply and one of the valve seats, there also being a port through the valve casing communicating with the exhaust and the other valve seat, and a plurality of ports through each of the valves, the ports in one of the valves being arranged to intermittently open communication between the fluid pressure supply and the cylinder, the ports in the other valve being arranged to intermittently open communication between the exhaust port from the cylinder and the exhaust; substantially as described.

4. An engine, comprising a plurality of cylinders, a valve casing above each cylinder, a plurality of tapered valve seats in each valve casing, a tapered valve in each seat, ports through said valve and the valve casing, for admitting fluid pressure to each cylinder and for opening the exhaust therefrom, a through shaft extending through all of said valves, springs on the ends of the shaft for retaining the end valves in position, a spring between adjacent valves for different cylinders for retaining said valves in position, and means for rotating the valve shaft; substantially as described.

In testimony whereof, I have hereunto set my hand.

PHILLIP O. TROUTMAN.

Witnesses:
MARGARET A. TROUTMAN,
ED. BUCHHOLZ.

Copies of this patent may be obtained for five cents each, by addressing the "Commissioner of Patents, Washington, D. C."